US007679218B1

(12) United States Patent
Isham

(10) Patent No.: US 7,679,218 B1
(45) Date of Patent: Mar. 16, 2010

(54) LOAD COMPENSATED SWITCHING REGULATOR

(75) Inventor: Robert H. Isham, Flemington, NJ (US)

(73) Assignee: Intersil Americas Inc., Milpitas, CA (US)

( * ) Notice: Subject to any disclaimer, the term of this patent is extended or adjusted under 35 U.S.C. 154(b) by 0 days.

(21) Appl. No.: 12/050,710

(22) Filed: Mar. 18, 2008

Related U.S. Application Data

(63) Continuation of application No. 11/557,143, filed on Nov. 7, 2006, now Pat. No. 7,345,463.

(51) Int. Cl.
*H02J 1/00* (2006.01)
(52) U.S. Cl. .......................................... 307/75; 307/87
(58) Field of Classification Search ................. 323/283, 323/284, 285; 307/75, 87, 45, 80
See application file for complete search history.

(56) References Cited

U.S. PATENT DOCUMENTS 5,254,878 A * 10/1993 Olsen ........................... 307/75
6,680,604 B2 * 1/2004 Muratov et al. ............. 323/285
6,894,461 B1 * 5/2005 Hack et al. .................. 323/205

* cited by examiner

*Primary Examiner*—Shawn Riley
(74) *Attorney, Agent, or Firm*—Gary R. Stanford

(57) ABSTRACT

A load compensation circuit for a switching regulator including a comparator circuit and an adjustable voltage source. The switching regulator includes a switch circuit for converting an input voltage to a regulated output voltage and for driving a load current, and a controlled switch driver circuit having a supply voltage input and an output driving the switch circuit. The comparator circuit senses the load current and adjusts a voltage control signal to adjust switching efficiency based on the load current. The voltage source has an input receiving the voltage control signal and an output for providing a switch supply voltage to the supply voltage input of the switch driver circuit, where the voltage source adjusts the switch supply voltage based on the voltage control signal. A method of compensating a switching regulator based on load including sensing load current and adjusting the switch supply voltage to adjust switching efficiency.

20 Claims, 5 Drawing Sheets

LOAD COMPENSATED SWITCHING REGULATOR

CROSS-REFERENCE TO RELATED APPLICATIONS

The present application is a continuation of U.S. patent application entitled "LOAD COMPENSATED SWITCHING REGULATOR", Ser. No. 11/557,143 filed Nov. 7, 2006, which is based on U.S. Provisional Patent Application entitled "LOAD COMPENSATED SWITCHING REGULATOR", Ser. No. 60/819,161 filed Jul. 7, 2006, both of which being hereby incorporated by reference in their entireties.

FIELD OF THE INVENTION

The invention relates to closed loop voltage regulators, and more particularly to switching regulators having networks for improving power efficiency.

BACKGROUND OF THE INVENTION

FIG. 1 shows a typical switching regulator 100, emphasizing the output section, while FIG. 2 shows pertinent switching waveforms for regulator 100. The control section of the regulator, not shown in detail, typically comprises an error amplifier with feedback components, a modulator circuit, and level shifters, collectively 110, to translate the resulting desired pulse widths into signal levels suitable for the Drivers 1 and 2. A reference voltage is typically applied to the non-inverting input of error amplifier contained in control section 110. The output of the error amplifier drives a pulse width modulator, PWM. The PWM outputs driver control signals shown as PWM1 and PWM2 which drive Driver 1 and Driver 2, respectively.

Drivers 1 and 2 take PWM 1 and PWM2 and drive relatively high currents into the gates of NMOS output devices M1 and M2. These signals are shown in FIG. 1 as UGATE and LGATE. The drivers normally also incorporate a non-overlap circuit (not shown), that prevents M1 and M2 from both conducting at the same time.

The desired output is at the node shown as PHASE, which is at the source of M1 and the drain of M2. During operation of regulator 100 PHASE switches between levels approaching $V_{IN}$ (when M1 on) and ground (when M2 on). PHASE then passes through a low pass filter comprising LF in series with CF, to become $V_{OUT}$ across load RL. Optional voltage and current feedback is shown, for instance, to maintain a specified relationship between output voltage and output current.

For reasons of economy, M1 and M2 are typically both double-diffused NMOS (DMOS). The driver for M2, the source of M2 being at ground, is typically powered from a supply (shown as LGATE Supply), which is also returned to ground.

It is desirable that M1, whose source is at node PHASE, has a driver and driver supply that is related to PHASE. Specifically, the power supply should move up and down with PHASE, keeping a relatively constant voltage with respect to PHASE. That supply, shown as BOOT supply, typically includes a diode such as D1 and capacitor such as the BOOT Cap shown. The voltage at node BOOT with respect to PHASE is approximately that provided by the BOOT supply.

The voltage at BOOT could be made related to ground rather than PHASE, if D1 was replaced with a direct connection and the BOOT cap was omitted. The BOOT supply voltage level would need to be higher than the $V_{IN}$ supply level (typically 5 V higher, or more) so that M1 can be strongly turned on, and when on, be in a low RDSon condition. This mode of operation is less desirable than a floating BOOT supply, as it requires higher voltage components and generates more wasted power. Further discussion will assume that a floating BOOT supply is used.

Very often the LGATE supply and the BOOT supply are the same supply. This might be due to a lack of pins available on an IC, for instance, when D1 is integrated within the IC.

There are conflicting requirements placed on the voltage selected for the BOOT and/or the LGATE supplies. The RDSon of a DMOS such as M1 or M2 contributes significantly to the power loss, or lack of power efficiency, of regulator 100. The average load current, Iload, flowing through inductor LF also flows through M1 or M2. The power loss in M1 or M2 is directly proportional to its RDSon multiplied by the square of Iload. As the RDSon of a DMOS can be improved (made lower) over a fairly wide range by increasing the Gate drive level, it is beneficial to use as high a value of BOOT or LGATE supply as the driver circuit can handle based on the voltage drop (RDSon component) considerations across M1 or M2.

A second major component of loss of efficiency for regulator 100 is the charge that must be inserted and removed from the DMOS' (M1 and M2) gate capacitance, once every switching cycle. Increasing the gate drive voltage increases the magnitude of the charge that must be inserted and removed each cycle, which increases the average current during switching. This increased average current gets dropped through the driver from an increased supply voltage. The gate capacitance induced power loss is therefore proportional to the square of the drive voltage, making it beneficial to use as low a driver voltage as possible.

FIG. 3 shows an exemplary plot of efficiency versus load current for higher and lower gate driver voltage supply levels for the regulator shown in FIG. 1. For purposes of simplicity, it is assumed that the BOOT and LGATE supplies are the same supply. The RDSon component of power loss through M1 and M2 is seen to tend to dominate at relatively high load currents, and the gate charge component of power loss tends to dominate at low load current levels. Accordingly, efficiency cannot be optimized for both high and low current operation. Instead, a relatively high fixed gate driver supply voltage is generally selected for regulator operation, thus wasting power when running at low load current levels. What is needed is a pulse width modulated converter design that provides different gate driver supply voltages for different load current levels that removes the tradeoff in efficiency between high load current and low load current operation.

SUMMARY

A load compensation circuit for a switching regulator according to one embodiment includes a comparator circuit and an adjustable voltage source. The switching regulator includes a switch circuit for converting an input voltage to a regulated output voltage and for driving a load current. The switching regulator further includes a controlled switch driver circuit having a supply voltage input and an output driving the switch circuit. The comparator circuit senses the load current and adjusts a voltage control signal to adjust switching efficiency based on the load current. The adjustable voltage source has an input receiving the voltage control signal and an output for providing a switch supply voltage to the supply voltage input of the switch driver circuit, where the adjustable voltage source adjusts the switch supply voltage based on the voltage control signal.

The adjustable voltage source may include a first voltage supply providing a first voltage, a second voltage supply providing a second voltage, and a switch. The switch has a control input receiving the voltage control signal and an output which selects between the first and second voltages for providing the switch supply voltage. In one embodiment, second voltage is greater than the first voltage, where the comparator circuit switches from selecting the first supply voltage to the second voltage when the load current exceeds a predetermined reference current level. In another embodiment, the comparator circuit includes a hysteresis comparator circuit which selects between the first and second voltages based on comparing the load current with first and second reference current levels.

In another embodiment, the adjustable voltage source includes a voltage source and a controlled voltage regulator. The voltage source provides a reference supply voltage having a highest desired voltage level for the supply voltage input of the switch driver circuit. The controlled voltage regulator has a first input receiving the voltage control signal, a second input receiving the reference supply voltage and an output providing the switch supply voltage based on the voltage control signal. In one embodiment, the controlled voltage regulator provides multiple discrete voltage levels based on corresponding levels of the load current.

In another embodiment, the comparator circuit includes at least one analog to digital converter, a memory and a voltage control digital to analog converter. A first analog to digital converter has an input for receiving a load current feedback signal and an output providing a load current value. The memory stores multiple supply voltage control values. The memory has a first input receiving the load current value and an output providing a selected supply voltage control value based on the load current value. The voltage control digital to analog converter has an input coupled to the output of the memory and an output providing the voltage control signal. The adjustable voltage source includes a voltage source providing a reference supply voltage and a controlled voltage regulator. The controlled voltage regulator has a first input receiving the voltage control signal, a second input receiving the reference supply voltage and an output providing the switch supply voltage based on the voltage control signal.

The memory may be implemented as a lookup table or the like. The comparator circuit may further include a second analog to digital converter having an input for receiving an output voltage feedback signal and an output providing an output voltage value. In this case the memory has a second input receiving the output voltage value, in which the memory selects from among the supply voltage control values based on the load current value and the output voltage value.

The comparator circuit may further include a third analog to digital converter having an input for receiving an input voltage and an output for providing an input voltage value. In this case the memory has a third input receiving the input voltage value, in which the memory selects from among the supply voltage control values based on the load current value, the output voltage value, and the input voltage value.

The memory may have a fourth input receiving a frequency signal indicative of switching frequency of the switching regulator. In this case, the memory selects from among the supply voltage control values based on the load current value, the output voltage value, the input voltage value, and the frequency signal. The selection is based on an attempt to maximize switching efficiency based on relationships and characteristics of the switching regulator.

A method of compensating a switching regulator based on load according to one embodiment includes sensing load current and adjusting a switch supply voltage provided to the supply voltage input of the switch driver circuit to adjust switching efficiency based on the sensed load current.

The method may include selecting from among multiple predetermined voltage levels. The method may include providing a reference supply voltage, providing a voltage regulator having an input receiving the reference supply voltage and an output providing the switch supply voltage relative to the reference supply voltage, and controlling the voltage regulator to adjust the switch supply voltage based on the sensed load current.

The method may include providing a voltage regulator having a control input receiving a voltage control value and an output providing the switch supply voltage based on the voltage control value, storing multiple supply voltage control values, receiving a load current value indicative of the load current, and selecting from among the supply voltage control values based on the load current value and providing the selected supply voltage control value to the control input of the voltage regulator.

The method may further include receiving an output voltage value indicative of output voltage, and selecting from the supply voltage control values based on the load current value and the output voltage value, and providing the selected supply voltage control value to the control input of the voltage regulator.

The method may include receiving an input voltage value indicative of input voltage, and selecting from among the supply voltage control values based on the load current value, the output voltage value and the input voltage value, and providing the selected supply voltage control value to the control input of the voltage regulator.

The method may further include receiving a frequency value indicative of switching frequency of the switching regulator, and selecting from among the supply voltage control values based on the load current value, the output voltage value, the input voltage value and the frequency value, and providing the selected supply voltage control value to the control input of the voltage regulator.

BRIEF DESCRIPTION OF THE DRAWINGS

A fuller understanding of the present invention and the features and benefits thereof will be accomplished upon review of the following detailed description together with the accompanying drawings, in which.

DETAILED DESCRIPTION

A load compensated voltage regulator is described herein that detects the load current and uses the load current, and optionally other measurables of circuit characteristics, to modulate the gate driver voltage supply level. Higher gate driver supply voltages are provided at higher load currents, and lower gate driver supply voltages at lower load currents. Such supply switching improves the power efficiency of the switching regulator. The gate driver voltage supply regulation may be implemented through analog circuitry, or primarily digital circuitry. Although the invention as described herein is shown as being based on CMOS circuitry, those having ordinary skill in the art will appreciate the invention can be realized in bipolar or BIMOS designs.

The error amplifier, pulse width modulator (PWM), and level shifters for the regulators according to the invention described herein are not part of the present invention, but as noted above are described herein for completeness. The load compensated voltage regulator comprises a chip including a control section comprising an error amplifier, a PWM, an input of the PWM being hooked to an output of the error amplifier. The PWM outputs at least one driver control signal. At least one driver has an input coupled to receive the driver control signal. At least one output transistor has an input coupled to an output of the driver. The output transistor drives an inductor in series with a grounded capacitor, wherein an output of the regulator ($V_{OUT}$) is at a node between the inductor and the capacitor, wherein $V_{OUT}$ generates a load current across a load when connected across the capacitor.

A feedback connector feeds back a feedback signal representative of the load current to circuitry for outputting a gate driver voltage supply control signal based on a reference level and the feedback signal. A connector couples at least one power supply to the driver through a switch or a second regulator. The gate driver voltage supply control signal is coupled to the switch or regulator, wherein the control signal modulates a voltage level of the power supply between at least two different levels based on the load current.

Generally, at least a pair of drivers comprising a first and second driver having respective inputs are coupled to receive first and second driver control signals output by the PWM. In this arrangement, first and second output transistors having respective inputs are coupled to outputs of the first and second drivers, respectively.

Figure 3:
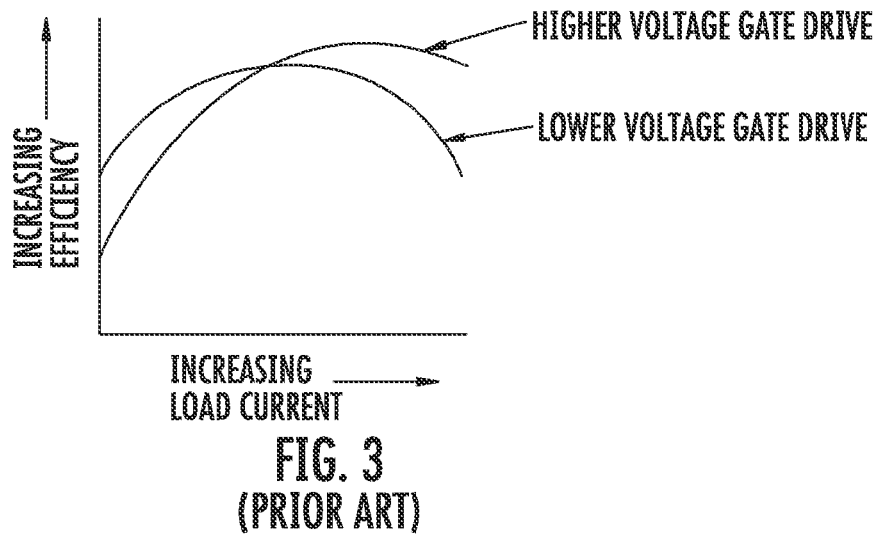
FIG. 3 shows a plot of efficiency versus load current for higher supply voltage gate drive levels and lower supply voltage gate drive levels for the regulator shown in FIG. 1.
Figure 4:
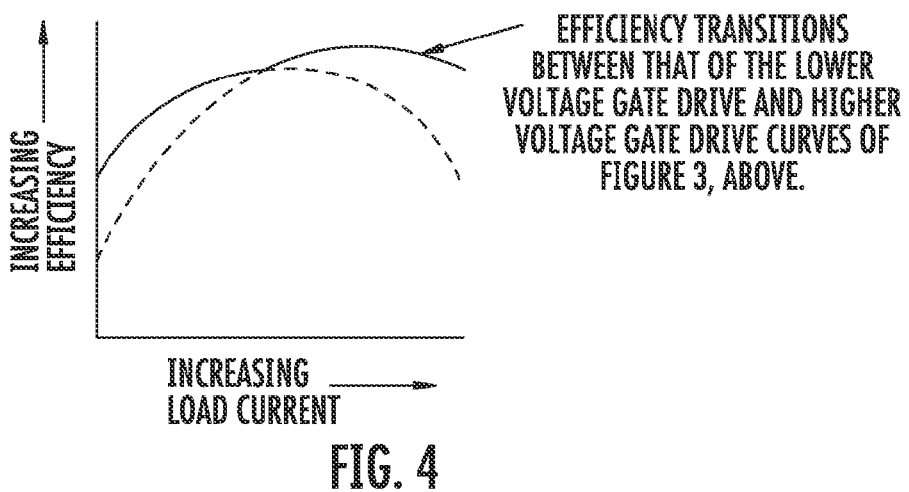
FIG. 4 shows a plot of efficiency versus load current using the load current modulated gate drive provided by regulators according to the invention derived from changing the supply voltage gate drive based on the load current level, such as regulator 500 shown in FIG. 5. The solid line shows the power efficiency realized by the present invention by transitioning between that of the lower supply voltage gate drive (used at low load currents) and higher supply voltage gate drive (used at higher load currents).

In the analog supply regulation embodiment of the present invention, for detecting load current to modulate the gate drive supply, a current comparator having a first reference input and second input can be connected to receive current feedback based on the load current. A connector couples a least one power supply to the first or second driver though a switch or a second regulator. The output of the comparator is connected to and controls the switch or regulator, wherein a signal from the comparator switches a voltage level of the power supply between at least two different levels based on the level of the load current. The invention thus provides a higher gate driver voltage supply at higher load currents, and lower gate driver voltage supply at lower load currents. The result of using the invention is the power efficiency curve shown as a solid line in FIG. 4, where the efficiency transitions between the low gate driver voltage supply drive curve for low load current and the high gate driver voltage supply curve for high load current curves shown in FIG. 3.

Figure 1:
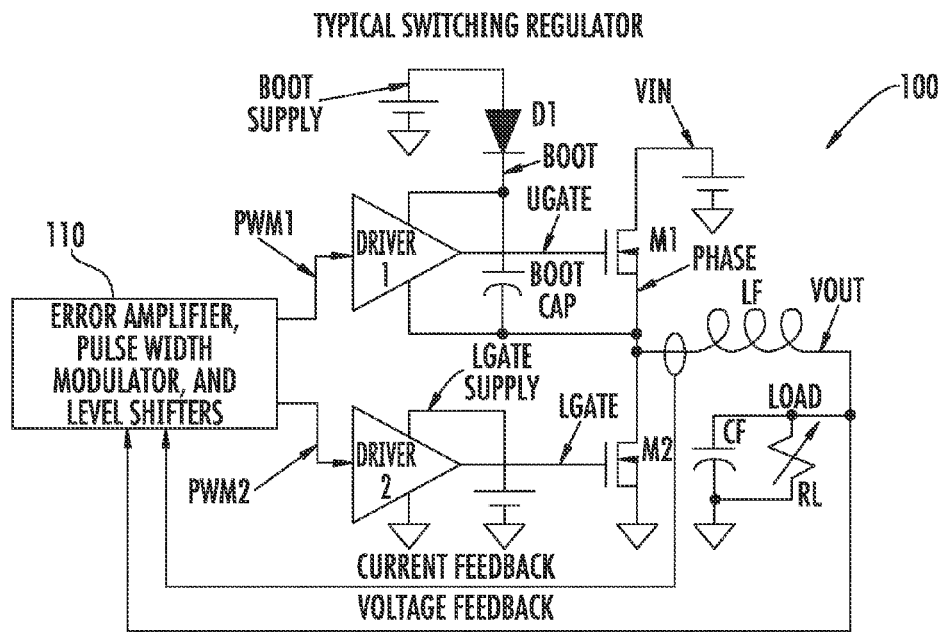
FIG. 1 shows the schematic of a known closed loop pulse width modulated DC-DC regulator with an emphasis on the output portion of the regulator.
Figure 2:
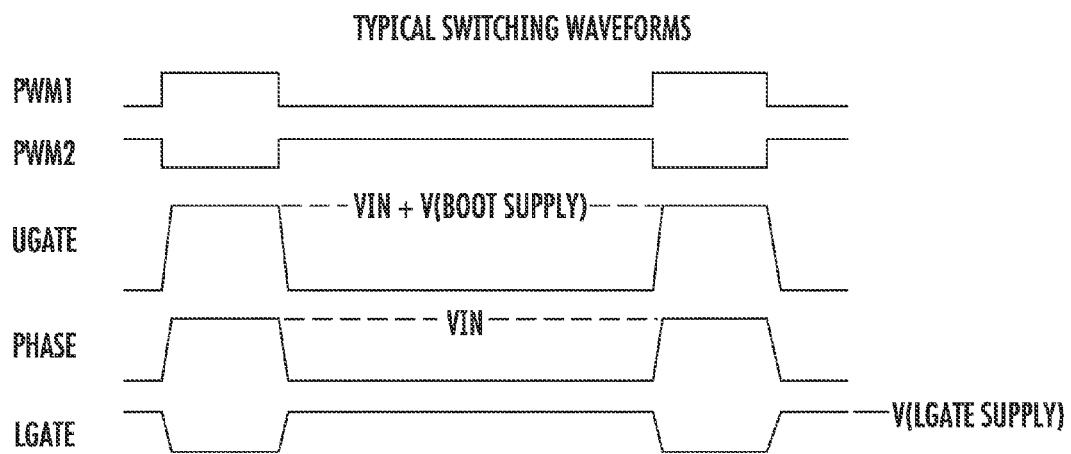
FIG. 2 shows typical switching waveforms at various internal nodes for the regulator shown in FIG. 1.
Figure 5:
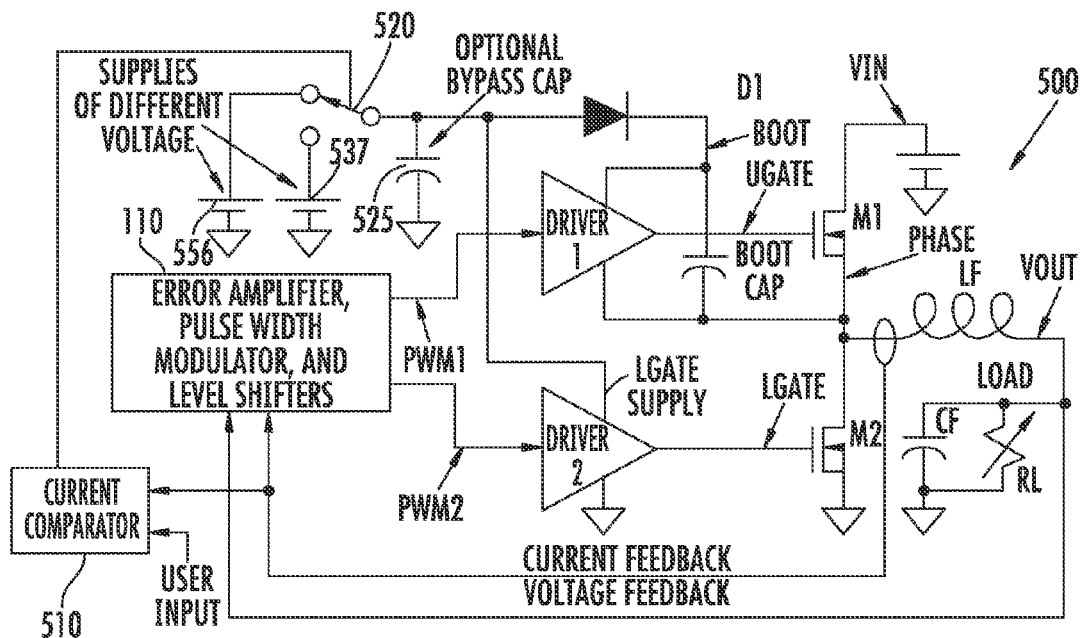
FIG. 5 shows the schematic of a closed loop pulse width modulated DC-DC regulator with added gate supply voltage switching according to an embodiment of the invention with emphasis on the output portion of the regulator.
Figure 5:
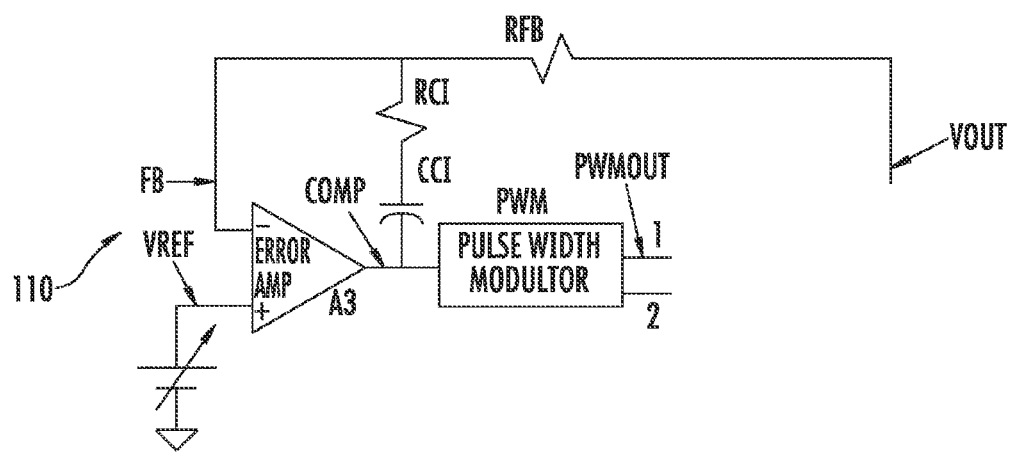

FIG. 5 shows the schematic of an exemplary closed loop pulse width modulated DC-DC regulator 500 with added analog gate driver voltage supply switching according to an embodiment of the invention with emphasis on the output portion of the regulator which illustrates the switched supply approach. Control section 110, not being part of the present invention, is shown in added detail below regulator 500 in FIG. 5. Compared to regulator 100 shown in FIG. 1, regulator 500 has an added current comparator 510 that compares the inductor current (being essentially on average equal to the load current) to some current level, such as a user inputted current level. The comparator 510 controls a switch 520 which selects between one of two different voltage supplies, 536 and 537, to send to the Drivers 1 and 2 which provide gate drive for M1 (UGATE) and M2 (LGATE), respectively.

Although two drivers, Driver 1 and Driver 2, are shown in FIG. 5, there can be arrangements other than exactly two drivers. For example, for multi-phase systems according to the invention there would be generally be more than 2 drivers, such as repeated (parallel) pairs of upper and lower drivers (not shown). There are also systems according to the invention where there is only an upper driver, such as where lower driver (Driver 2) and FET (M2) are replaced by a passive diode (not shown).

Although M1 and M2 are described herein as being n-channel DMOS transistors, M1 and M2 can be conventional single diffused transistors, or can be p-channel transistors. P-channel transistors would require a different driver connection than that shown in FIG. 5.

It is generally desirable to bypass the drive supplies 536 and 537 with a capacitor, such as bypass capacitor 525, so that pulsed loads that are typical of driving the DMOS gates of M1 and M2 do not cause a significant voltage drop across the switch 520 which selects between the respective supplies 536 and 537. Bypass capacitor 525 can be internal or external to the chip. In the case of external placement, this might result in an additional pin on the IC to accommodate the addition of an external bypass capacitor.

An extra supply is not generally required to support supply switching regulators according to the invention. In an IC, there might be two supplies providing different voltage levels already available on chip, such as a relatively high voltage supply used for $V_{IN}$ (for the output stage) and a lower voltage supply used to power the small signal circuitry. In this case, these two (2) existing supply inputs could be used as power supplies for supplies 536 and 537, respectively.

The BOOT and/or LGATE voltage supplies could be switched between two or more specific supply voltages based on one or more specific load current levels. Some hysteresis might be desirable, so that load currents near the switching point(s) do not create switching back and forth between the respective drive supplies. In one embodiment, hysteresis can be implemented by a pair of comparators 510 and switches 520, with a first comparator, an inverter, and a first switch associated with one power supply 536, and a second comparator and a second switch associated with the other power supply 537. In this arrangement, one load current level is used as a first reference input to the first comparator coupled an inverter which is coupled to the first switch to switch to the lower supply voltage level when the load current is less than the first reference level. A higher load current level is used as a reference level to the second comparator coupled to the second switch to switch to the higher supply voltage level when the load current exceeds the second reference level.

When switching from the higher voltage supply to the lower voltage supply it might be desirable to first allow the bypass capacitor 525 to discharge until its voltage is close to the voltage of the lower supply. This discharge would be a natural result of the average supply current being drawn by the drivers. Only when the capacitor voltage gets close to the lower voltage supply would the switch 520 to that supply be turned on. This avoids "dumping" the energy in the capacitor when turning on switch 520, causing wasted power dissipation.

Although the load current levels at which the gate drive supplies are switched is shown as being user adjustable in FIG. 5 based on user input of a reference current level to comparator 510, the load current levels can instead be set on the chip. For example, one or more reference inputs to the IC could be provided for the IC to compare the sensed load current against. For instance, due lack of available pins, the supply switching points may be made to be fixed ratios of some other settable current, such as the over current trip current which is generally always already available. For example, if the over current trip point is user settable, the supply switching point could be made a fixed percentage of that, such as, for example, 10, 20 or 30% of the over current trip point.

Figure 6:
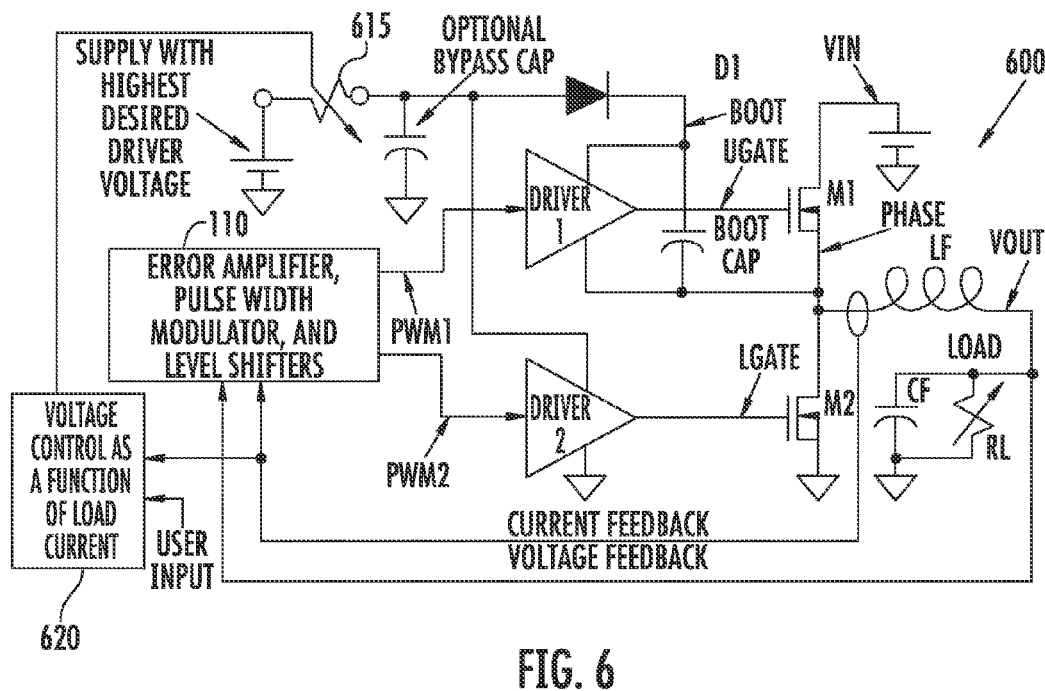
FIG. 6 shows the schematic of a closed loop pulse width modulated DC-DC regulator with added gate voltage supply switching implemented with a regulated supply according to an alternate embodiment of the invention.

FIG. 6 shows the schematic of a closed loop pulse width modulated DC-DC regulator 600 having added gate driver voltage supply switching implemented with a regulated supply according to an alternate embodiment of the invention. Instead of switching the gate driver voltage supply between two or more fixed supplies using a comparator signal, a single voltage supply together with a voltage regulator 615 and a voltage controller 620 can be used. The single fixed supply provides a level at least as high as the desired highest driver supply voltage, and the regulator 615 controlled by voltage controller 620 drops the regulated supply voltage as a function of load current. For instance, the user might provide two or more current reference input levels corresponding with two or more voltage levels. The voltage regulator 620 would transition between the lower voltage when the load is at the lower reference current to the upper voltage when the load is at the upper current reference.

Regarding regulator 600, there is generally some power loss to be expected if regulator 600 used a linear regulator to reduce the driver supply voltage. However, since switching power losses are related to the square of the driver supply voltage, a net overall benefit in power efficiency results using regulator 600.

More generally, gate driver voltage supply switching could be applied to only the LGATE supply or only the BOOT supply, with the other supply being unswitched. Alternately, two different relationships could be used, such as one that relates the BOOT supply voltage to one load current level and one that relates the LGATE supply voltage to another load current, such as the hysteresis arrangement described above.

Figure 7:
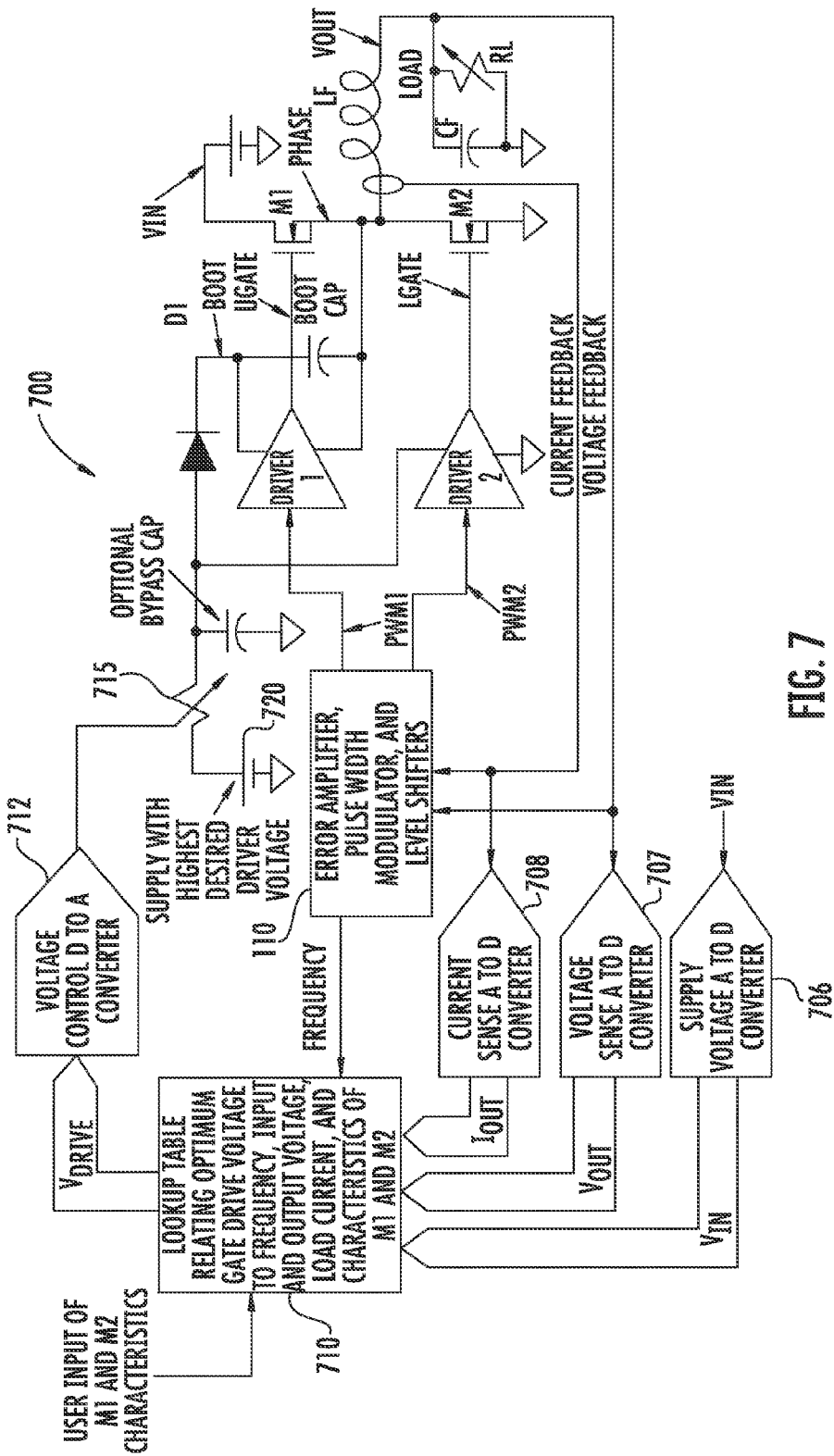
FIG. 7 shows the schematic of an exemplary closed loop pulse width modulated DC-DC regulator which utilizes digital circuitry for implementing gate drive supply voltage switching.

Regarding the digital supply regulation embodiment of the present invention, FIG. 7 shows the schematic of an exemplary closed loop pulse width modulated DC-DC regulator with added digital gate driver voltage supply switching 700, according to an embodiment of the invention. As before, the schematic provided emphasizes the output portion of the regulator.

Regulator 700 provides factors that significantly affect power efficiency, digitizes analog output measures, and feeds the efficiency affecting measures to a digital block, comprising an circuit implementing an algorithm or look up table 710 (referred to hereafter as look up table 710). The digital implementing components can all be formed on the same chip as the conventional regulator components. The analog measures shown in FIG. 7 include load current ($I_{OUT}$) and output voltage ($V_{OUT}$) which are coupled to A/D converters 708 and 707, respectively. The $V_{IN}$ supply level is also shown digitized by A/D 706. The digital outputs of A/Ds 706-708 as well as frequency information from control section 110 are provided to look up table 710, which also stores relationships and characteristics that affect regulator power efficiency. The relationships and characteristics can include characteristics of output devices M1 and M2, such as both gate charge and RDSon verses gate drive voltage level. In one embodiment, these characteristics of M1 and M2 can be entered into look up table 710 externally by user input.

The resulting digital output shown as $V_{DRIVE}$ from look up table 710 is converted back to an analog signal using D/A converter 712, which is used to modulate the gate drive voltage supply level using supply 720. Supply 720 provides the highest desired driver voltage coupled to voltage regulator 715. The output provided by regulator 715 is the optimum gate driver voltage which is utilized as the BOOT and LGATE supply to Drivers 1 and 2, which provide gate drive for M1 (UGATE) and M2 (LGATE), respectively.

Although the UGATE/BOOT and LGATE voltage supply are the same in regulator 700 shown in FIG. 7, separate supplies can also be used, such as using separate regulators or a switch-based arrangement analogous to regulator 500 shown in FIG. 5. Hysterisis as described above can also be implemented for regulator 700.

The invention can be used to provide improved power efficiency for switching regulator circuits including DC-DC converters, motor controller circuits, and the like, particularly those that handle a wide range of load currents. The invention may be used in conjunction with other efficiency improvement structures ands related methods.

It is to be understood that while the invention has been described in conjunction with the preferred specific embodiments thereof, that the foregoing description as well as the examples which follow are intended to illustrate and not limit the scope of the invention. Other aspects, advantages and modifications within the scope of the invention will be apparent to those skilled in the art to which the invention pertains.

The invention claimed is:

1. A load compensation circuit for a switching regulator, wherein the switching regulator includes a switch circuit for converting an input voltage to a regulated output voltage and for driving a load current, and wherein the switching regulator includes a controlled switch driver circuit having a supply voltage input and an output driving the switch circuit, said load compensation circuit comprising:

a comparator circuit for sensing the load current and for providing a voltage control signal indicative thereof, and an adjustable voltage source having an input receiving said voltage control signal and an output for providing a switch supply voltage to the supply voltage input of the switch driver circuit, wherein said adjustable voltage source adjusts said switch supply voltage based on said voltage control signal;

wherein said comparator circuit adjusts said voltage control signal to adjust switching efficiency based on the load current.

2. The load compensation circuit of claim 1, wherein said adjustable voltage source comprises:

a first voltage supply providing a first voltage;
a second voltage supply providing a second voltage; and
a switch having a control input receiving said voltage control signal and an output which selects between said first and second voltages for providing said switch supply voltage.

3. The load compensation circuit of claim 2, wherein said second voltage is greater than said first voltage, and wherein said comparator circuit switches from selecting said first supply voltage to said second voltage when the load current exceeds a predetermined reference current level.

4. The load compensation circuit of claim 2, wherein said comparator circuit comprises a hysteresis comparator circuit which selects between said first and second voltages based on comparing the load current with first and second reference current levels.

5. The load compensation circuit of claim 4, wherein said first and second reference current levels are based on first and second ratios, respectively, of an over current trip point.

6. The load compensation circuit of claim 1, wherein said adjustable voltage source comprises:
a voltage source providing a reference supply voltage having a highest desired voltage level for the supply voltage input of the switch driver circuit; and
a controlled voltage regulator having a first input receiving said voltage control signal, a second input receiving said reference supply voltage and an output providing said switch supply voltage based on said voltage control signal.

7. The load compensation circuit of claim 6, wherein said controlled voltage regulator increases said switch supply voltage with increased load current.

8. The load compensation circuit of claim 6, wherein said controlled voltage regulator provides a plurality of discrete voltage levels based on corresponding levels of the load current.

9. The load compensation circuit of claim 1, wherein:
said comparator circuit comprises:
a first analog to digital converter having an input for receiving a load current feedback signal and an output providing a load current value;
a memory storing a plurality of supply voltage control values, wherein said memory has a first input receiving said load current value and an output providing a selected one of said plurality of supply voltage control values based on said load current value; and
a voltage control digital to analog converter having an input coupled to said output of said memory and an output providing said voltage control signal; and
wherein said adjustable voltage source comprises:
a voltage source providing a reference supply voltage; and
a controlled voltage regulator having a first input receiving said voltage control signal, a second input receiving said reference supply voltage and an output providing said switch supply voltage based on said voltage control signal.

10. The load compensation circuit of claim 9, wherein said memory comprises a lookup table.

11. The load compensation circuit of claim 9, wherein said comparator circuit further comprises a second analog to digital converter having an input for receiving an output voltage feedback signal and an output providing an output voltage value, wherein said memory has a second input receiving said output voltage value, and wherein said memory selects from among said plurality of supply voltage control values based on said load current value and said output voltage value.

12. The load compensation circuit of claim 11, wherein said comparator circuit further comprises a third analog to digital converter having an input for receiving an input voltage and an output for providing an input voltage value, wherein said memory has a third input receiving said input voltage value, and wherein said memory selects from among said plurality of supply voltage control values based on said load current value, said output voltage value, and said input voltage value.

13. The load compensation circuit of claim 12, wherein said memory has a fourth input receiving a frequency signal indicative of switching frequency of the switching regulator, and wherein said memory selects from among said plurality of supply voltage control values based on said load current value, said output voltage value, said input voltage value, and said frequency signal in an attempt to maximize said switching efficiency based on relationships and characteristics of the switching regulator.

14. A method of compensating a switching regulator based on load, wherein the switching regulator includes a switch circuit for converting an input voltage to a regulated output voltage and for driving a load current and wherein the switching regulator includes a controlled switch driver circuit having a supply voltage input and an output driving said switch circuit, said method comprising:
sensing load current; and
adjusting a switch supply voltage provided to the supply voltage input of the switch driver circuit to adjust switching efficiency based on the sensed load current.

15. The method of claim 14, wherein said adjusting a switch supply voltage comprises selecting from among a plurality of predetermined voltage levels.

16. The method of claim 14, wherein said adjusting a switch supply voltage comprises:
providing a reference supply voltage;
providing a voltage regulator having an input receiving the reference supply voltage and an output providing the switch supply voltage relative to the reference supply voltage; and
controlling the voltage regulator to adjust the switch supply voltage based on the sensed load current.

17. The method of claim 14, further comprising:
providing a voltage regulator having a control input receiving a voltage control value and an output providing the switch supply voltage based on the voltage control value;
storing a plurality of supply voltage control values;
wherein said sensing load current comprises receiving a load current value indicative of the load current; and
wherein said adjusting a switch supply voltage comprises selecting from among the plurality of supply voltage control values based on the load current value and providing the selected supply voltage control value to the control input of the voltage regulator.

18. The method of claim 17, further comprising:
receiving an output voltage value indicative of output voltage; and
wherein said selecting comprises selecting from among the plurality of supply voltage control values based on the load current value and the output voltage value, and providing the selected supply voltage control value to the control input of the voltage regulator.

19. The method of claim 18, further comprising:
receiving an input voltage value indicative of input voltage; and wherein said selecting comprises selecting from among the plurality of supply voltage control values based on the load current value, the output voltage value and the input voltage value, and providing the selected supply voltage control value to the control input of the voltage regulator.

20. The method of claim 19, further comprising:
receiving a frequency value indicative of switching frequency of the switching regulator; and
wherein said selecting comprises selecting from among the plurality of supply voltage control values based on the load current value, the output voltage value, the input voltage value and the frequency value, and providing the selected supply voltage control value to the control input of the voltage regulator.

* * * * *